Oct. 9, 1951        R. E. W. BACON        2,571,004
FEEDER FOR RABBITS AND POULTRY
Filed Oct. 16, 1948
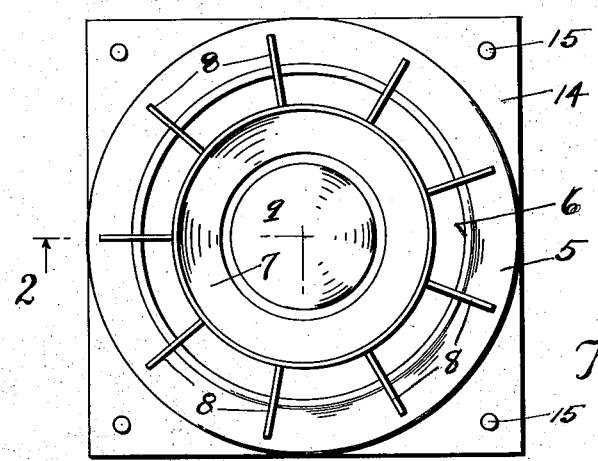
Fig.1
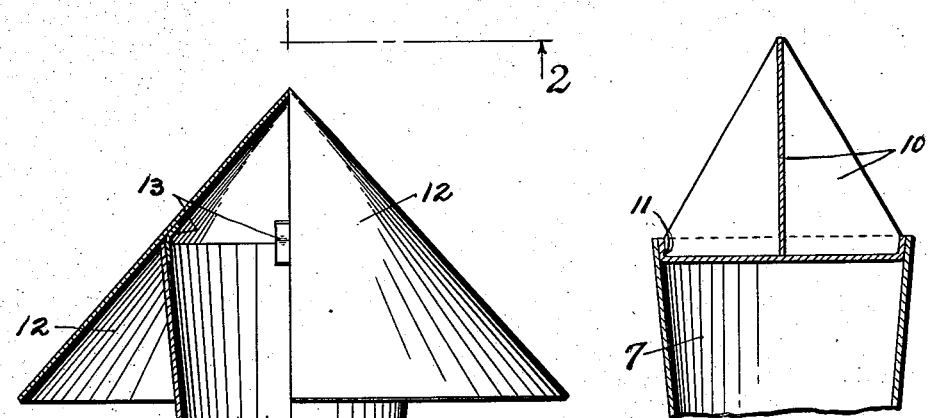
Fig.3
Fig.2
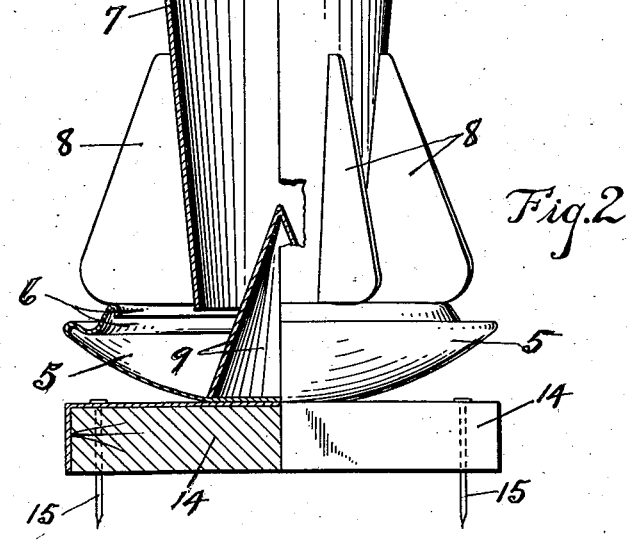
INVENTOR,
Ralph E. W. Bacon
BY
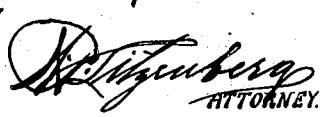
ATTORNEY.

Patented Oct. 9, 1951

2,571,004

UNITED STATES PATENT OFFICE 2,571,004

FEEDER FOR RABBITS AND POULTRY

Ralph E. W. Bacon, Manhattan Beach, Calif.

Application October 16, 1948, Serial No. 54,877

1 Claim. (Cl. 119—52)

This invention relates to feeders for rabbits and poultry, and more particularly to a feeder for holding grain and the like for rabbits, poultry and the like in such a way that the feed cannot be wasted, and cannot be spoiled by reason of the rabbits getting into the feed holders, or otherwise soiling it.

It is known that rabbits have the habit of getting into the feed containers and that a great deal of feed is spoiled and also wasted by being kicked or crowded out of the holder on to the ground or hutch floor. It is also known that poultry scratch the feed out of the holders and otherwise waste it.

It is an object of this invention to provide a feeder in which the feed can be placed and from which it can only be taken by the rabbit or poultry reaching into a prescribed area to pick up in its mouth such feed as it desires, with safeguards to prevent the feed from being nosed or pawed out of the holder and also to prevent the rabbit from getting into the feed, etc.

In order to explain my invention more in detail, I have shown on the accompanying sheet of drawings one practical embodiment thereof, which I will now describe.

Figure 1 is a plan view looking down upon a feeder embodying my invention, with cover removed;

Figure 2 is a side elevation of the same, partly in vertical section to show the construction and arrangement of the parts making the device efficient along the lines suggested; and Figure 3 is a detail of a modified form of cap or top to be placed in the vertical reservoir to prevent rabbits from sitting thereon.

Referring now in detail to the drawings, my feeder as here illustrated for explanatory purposes includes a feed bowl 5, having an inturned flange around its edge, designated 6, and overhanging the feed in the bowl in such a way that the feed therein cannot be raked or pawed out by the rabbit or scratched out by poultry.

A conical feed holder 7, having its small end in the opening of said feed bowl, is shown in place, with a series of spaced wings or vanes 8, 8, therearound, secured at their inner edges to said conical feed holder and also to the top edge of the inturned flange part of the feed bowl. These wings or vanes are sufficiently close together so as to prevent the rabbit from getting anything but its mouth between them, and down into the bowl therebetween. They also support said conical feed holder rigidly in connection with the bowl.

Mounted on the bottom of the feed bowl, in the center thereof, is an upstanding cone 9, extended up into the lower end of said conical feed holder, in the manner indicated, to cause the feed from said holder to run down into the bowl under the overhanging flange 6.

In order to prevent rabbits or poultry from getting upon the top of the conical feed holder, in Fig. 3, I have shown an insert cone 10, which can be placed therein as shown and which will prevent this and will also close the top of said cone having a flange 11 to fit inside the top of the feed holder as shown.

In order to provide a cover for the top of the feed holder and also to project over the feed bowl sufficiently to prevent rain from getting into the feed and the bowl, I have shown a cone cap 12, having supporting lugs, as 13, on the inside and which can be hooked over the top of the holder 7, as seen in Fig. 2.

The feeder can be mounted on a block or base 14, with spikes 15 therethrough for anchoring it on the ground, or the floor of a hutch or pen, as may be desired, or the feeder can be suspended or supported in any way best suited to the place where it is to be used.

Thus I have provided a feeder for rabbits and poultry which is absolutely waste-proof and which is also proof against spoiling the feed in the feed bowl, and while I have shown one practical embodiment thereof, I am aware that changes can be made therein without departing from the spirit thereof, and I do not limit the invention to the showing made, except as I may be limited by the hereto appended claim forming a part of this specification.

I claim:

A feeder of the character shown and described including a bowl having its upper edge turned inwardly and downwardly to form an annular overhanging guard to prevent feed from being pulled out of the bowl, a conical feed holder centrally over said bowl, with cover therefor, and a series of vertical spaced supporting wings or vanes secured to said feed holder longitudinally thereof, around its circumference, and resting at their lower edges upon said inturned edge of said bowl, said wings projecting radially outwardly over the inturned edge of said bowl to define feeding spaces therebetween.

RALPH E. W. BACON.

(References on following page)

REFERENCES CITED

The following references are of record in the file of this patent:

UNITED STATES PATENTS

| Number | Name | Date |
|---|---|---|
| 503,664 | Jones | Aug. 22, 1893 |
| 985,201 | Owens | Feb. 28, 1911 |
| 1,026,859 | Garrison | May 21, 1912 |
| 1,070,850 | Siddons | Aug. 19, 1913 |
| 1,121,528 | Mueller | Dec. 15, 1914 |
| 1,159,190 | Derr | Nov. 2, 1915 |
| 1,214,145 | Euker | Jan. 30, 1917 |
| 1,286,002 | Hoffman | Nov. 26, 1918 |
| 1,534,375 | Foucht | Apr. 21, 1925 |
| 1,582,723 | Ahlman | Apr. 27, 1926 |
| 2,505,396 | Grindstaff | Apr. 25, 1950 |

FOREIGN PATENTS

| Number | Country | Date |
|---|---|---|
| 201,365 | Great Britain | Aug. 2, 1923 |